Aug. 16, 1960

M. F. SMITH 2,949,283

APPARATUS FOR HEAT TRANSFER

Filed May 11, 1956

INVENTOR
Millard F. Smith
BY
John C. Blair
ATTORNEY

United States Patent Office 2,949,283
Patented Aug. 16, 1960

2,949,283

APPARATUS FOR HEAT TRANSFER

Millard F. Smith, Rayfield, Conn.

Filed May 11, 1956, Ser. No. 584,226
2 Claims. (Cl. 257—137)

Figures 1, 2, 3, 4:
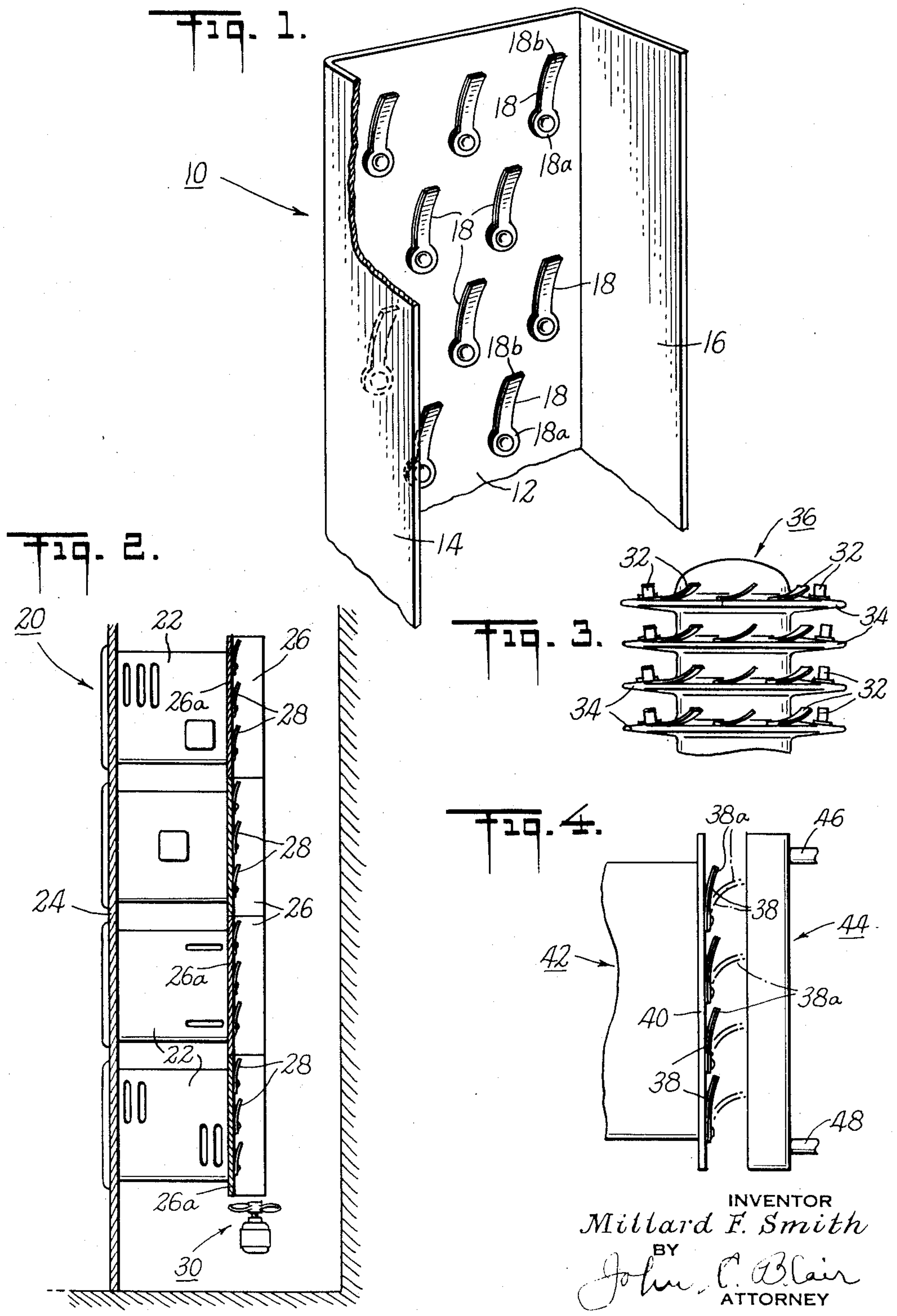

This invention relates to apparatus for facilitating the cooling of various types of equipment whose operation entails the generation of large quantities of heat. More specifically, the invention is concerned with apparatus to be associated with large electronic equipment having many heat-generating components which are closely interfitted in small places and hence posing difficult problems of air cooling circulation.

Electronic equipment is now being used for manifold purposes on a very large scale and many of such uses require masses of individual components closely interfitted, and capable of generating large quantities of heat. In many instances space is at a premium and so this equipment is designed to interfit into relatively small cubage so that the heat generated by the components is not only trapped, but it is also difficult to ventilate the apparatus by the usual methods because of various obstructions and the tortuous path between such parts. For example, while fans are often used in an effort to force air through the equipment, air circulation often fails to reach vital parts thereof. This heavy generation of heat concentrated at various points in the electronic equipment often has a most adverse and damaging effect on some of the components reducing the operating life of many of these parts and resulting in frequent equipment failure.

Accordingly, one of the objects of this invention is to provide cooling apparatus designed to be associated with heat generating electronic equipment to cool the individual components thereof by continuously drawing heat away from its interior. Another object of this invention is to provide apparatus of the above character which is simple in construction and hence enonomical in manufacture. Another object of this invention is to provide apparatus of the above character which may be embodied in a variety of equipments, hence reducing problems of installation and maintenance. Another object of this invention is to provide apparatus of the above character which does not consume substantial amounts of space and whose efficiency results in considerable cooling of the interior parts of the equipment. Other objects will in part be obvious and in part pointed out hereinafter.

The invention accordingly comprises the features of construction, combinations of elements, and arrangements of parts, which will be exemplified in the constructions hereinafter set forth and the scope of the invention will be indicated in the claims.

In the accompanying drawings in which are shown several of the possible embodiments of this invention, Figure 1 is a fragmentary perspective view of a cooling duct comprising one embodiment of my invention, Figure 2 is a diagrammatic elevation partially in section of electronic equipment with another embodiment of my cooling apparatus installed thereon, Figure 3 is a fragmentary elevational view of the cylinder head of an engine having an embodiment of my cooling apparatus applied thereto, and Figure 4 is a fragmentary elevation of another embodiment of my cooling apparatus.

Similar reference characters refer to similar parts throughout the several views of the drawings.

Generally speaking the invention comprises the utilization of a plurality of bi-metallic strips or elements each of which is fastened at one end to a base or plate member which is in thermal contact with the equipment to be cooled. Thus the free end of each of these elements is free to move toward and away from the base or plate member, all depending upon the temperature of the base as reflected in the elements. The elements are so designed that they will lie substantially flush with the base when it is at the ideal temperature. However, as the temperature of the base rises the elements bend or loop outwardly thus to be exposed to air currents in this position. They thus act to draw heat from the base as the base draws it from the equipment so that it may be more easily dissipated to the atmosphere.

Referring now to Figure 1 a channel-piece generally indicated at 10 includes a base 12 and sides 14 and 16. Mounted on base 12 are a plurality of bi-metallic strips 18. Strips 18 include base portions 18*a* welded or otherwise secured to base 12, and free end portions 18*b*. Elements 18 are of standard bi-metallic construction designed to be substantially straight when at the ideal temperature and to bend outwardly away from base 12 when heated to any appreciable point thereabove.

It will now be seen that channel piece 10 may be secured to the framework of electronic equipment, where cooling is desired during operation, and it is preferably vertically so disposed. Thus, in operation as the electronic equipment generates heat it is conducted to the channel piece 10 and particularly base portion 12. The bi-metallic elements 18 when heated bow outwardly, as illustrated in the drawing, and convection currents passing upwardly through the channel-piece conduct the heat away from the equipment. Thus a simple means is provided for continuously drawing heat away from the various components of the electronic equipment.

In Figure 2 there is illustrated electronic equipment generally indicated at 20 including a series of units 22 mounted on a panel or the like 24. A duct 26 having a base 26*a* secured to the units 22 is vertically disposed with respect to the electronic equipment. A plurality of bi-metallic elements 28 similar in construction of bi-metallic elements 18 (Figure 1) are connected in a like manner to base 26*a* with their free ends pointing upwardly as shown in Figure 2. Preferably an electric fan generally indicated at 30, is disposed beneath duct 26 and in operation forces a draft of air therethrough.

When the electronic equipment is operating and the units 22 generating heat with fan 30 forcing a draft of air through duct 26 past elements 28, these elements act in the manner previously described with respect to bi-metallic elements 18. Thus, the heating of base 26*a* by the units 22 causes the bi-metallic elements 28 to move outwardly or bow into the path of the air being forced therethrough by the fan 30. Thus this air picks up heat from the bi-metallic elements and carries it away from the electronic equipment. It will be understood that the supports in the individual units 22 are metallic in most instances so that the heat is rapidly conducted from the individual components through the framework to the base 26*a* and to bi-metallic elements 28 to be dissipated in the draft of air passing upwardly through the duct 26. Of course while it is preferable to use the fan 30, it is not an essential feature of the invention for effective cooling results may be achieved by utilization of convection currents.

In Figure 3 bi-metallic elements 32 substantially similar to bi-metallic elements 18, are similarly secured to the fins 34 of a cylinder head generally indicated at 36. Thus, as the cylinder head becomes hot during engine operation the elements 32 bow outwardly to be exposed to the atmosphere. Accordingly, a much larger metallic surface is exposed to the atmosphere than is possible with the fins by themselves, and this aids in dissipation of the heat to the surrounding atmosphere.

In Figure 4 I have shown a further embodiment of the invention wherein bi-metallic elements 38 are substantially similar in construction and operation to the bi-metallic elements 18 shown in Figure 1. Thus, elements 38 are secured to a base 40 of electronic equipment diagrammatically indicated at 42. Upon heating by operation of the electronic equipment the free ends 38*a* of the elements bow outwardly. Facing plate 40 and spaced therefrom is a cooling element generally indicated at 44 which may be of any suitable construction. It is here shown as a tank through which cooling water may be circulated via pipes 46 and 48. The front face 44*a* opposite base 40 is so positioned with respect to the elements 38 that when they bow outwardly during heating of the base 40 by the electronic equipment their ends 38*a* will engage the front face 44*a* of the cooling member. Accordingly, it will be seen that in this embodiment of the invention, further cooling is effected, to wit, not only will heat be drawn away from the bimetallic elements 38 by air currents circulating thereabout in the manner described above, but also further heat will be conducted therefrom into the cooling member 44. It is to be understood that the cooling element 44 might be mounted conveniently on the duct 26 illustrated in Figure 2, to cool that portion of the duct facing the bi-metallic elements 28. Thus the cooling effect of that apparatus would be materially increased. It will, of course, be understood that this apparatus might be used in reverse for heating equipment instead of cooling it. Thus the bi-metallic elements would be associated with the equipment to be heated and arranged to bow outwardly into the path of the hot air or the like when heating was desired.

It will thus be seen that the objects set forth above among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

I claim:

1. Temperature regulating apparatus for maintaining the temperature of heat-generating equipment within preselected and acceptible limits, comprising, in combination, a heat-conducting member in thermal contact with said heat-generating equipment and a plurality of bimetallic thermally-conductive heat-dissipating elements, each having a fixed end secured to said heat-conducting member and a projecting free end disposed substantially parallel to the surface of said member when the temperature of said equipment is below a preselected value, said elements being intermittently spaced over the area of said heat-conducting member and adapted to increase their curvature progressively in response to progressive increases in the temperature of said equipment, and means for passing a fluid coolant over the surfaces of said member and elements, whereby the ambient fluid is induced to flow over increasing effective immersed surface areas of said elements as the temperature of said equipment increases.

2. The combination defined in claim 1 wherein said means is a fan for propelling a gas past said heat-dissipating elements.

References Cited in the file of this patent

UNITED STATES PATENTS

| | | |
|---|---|---|
| 1,459,318 | Birdsall | June 19, 1923 |
| 1,764,194 | Bruehl et al. | June 17, 1930 |
| 1,925,822 | Shurtleff | Sept. 5, 1933 |
| 2,158,868 | Stacy | May 16, 1939 |
| 2,169,115 | Steenstrup | Aug. 8, 1939 |
| 2,380,026 | Clarke | July 10, 1945 |
| 2,451,903 | Bauman | Oct. 19, 1948 |
| 2,471,960 | Johnson | May 31, 1949 |
| 2,774,808 | Bullock | Dec. 18, 1956 |

FOREIGN PATENTS

| | | |
|---|---|---|
| 175,143 | Switzerland | Apr. 16, 1935 |

UNITED STATES PATENT OFFICE

CERTIFICATION OF CORRECTION

Patent No. 2,949,283 August 16, 1960

Millard F. Smith

It is hereby certified that error appears in the above numbered patent requiring correction and that the said Letters Patent should read as corrected below.

In the grant, line 3, address of inventor, for "Rayfield, Connecticut," read -- Rayfield, Westport, Connecticut, --; in the heading to the printed specification, line 3, for "Rayfield, Conn." read -- Rayfield, Westport, Conn. --.

Signed and sealed this 20th day of June 1961.

(SEAL)
Attest:

ERNEST W. SWIDER
Attesting Officer

DAVID L. LADD
Commissioner of Patents